US012743618B2

(12) United States Patent
Gu et al.

(10) Patent No.: US 12,743,618 B2

(45) **Date of Patent: *Sep. 22, 2026**

(54) PRIVACY ENHANCING DEEP LEARNING CLOUD SERVICE USING A TRUSTED EXECUTION ENVIRONMENT

(71) Applicant: International Business Machines Corporation, Armonk, NY (US)

(72) Inventors: Zhongshu Gu, Ridgewood, NJ (US); Heqing Huang, Mahwah, NJ (US); Jialong Zhang, White Plains, NY (US); Dong Su, Sunnyvale, CA (US); Dimitrios Pendarakis, Westport, CT (US); Ian M. Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1168 days.

This patent is subject to a terminal disclaimer.

(21) Appl. No.: 17/743,571

(22) Filed: May 13, 2022

(65) Prior Publication Data

US 2022/0269942 A1 Aug. 25, 2022

Related U.S. Application Data

(63) Continuation of application No. 16/016,752, filed on Jun. 25, 2018, now Pat. No. 11,443,182.

(51) Int. Cl.

*G06N 3/08* (2023.01)
*G06F 21/53* (2013.01)
(Continued)

(52) U.S. Cl.

CPC ............... *G06N 3/08* (2013.01); *G06F 21/53* (2013.01); *G06F 21/602* (2013.01); *G06N 3/063* (2013.01); *G06F 2221/034* (2013.01)

(58) Field of Classification Search

CPC .......... G06N 3/063; G06N 3/08; G06N 3/045; G06N 3/0464; G06F 21/53; G06F 21/602; G06F 2221/034

See application file for complete search history.

(56) References Cited

U.S. PATENT DOCUMENTS

| | | | | |
|---|---|---|---|---|
| 10,755,172 | B2 * | 8/2020 | Gupta | G06N 3/084 |
| 11,222,138 | B2 * | 1/2022 | Mohassel | A63B 21/222 |

(Continued)

FOREIGN PATENT DOCUMENTS

| | | | |
|---|---|---|---|
| EP | 3327726 | A1 | 5/2018 |
| JP | 2018005317 | A | 1/2018 |

(Continued)

OTHER PUBLICATIONS

Liu, Jian et al., "Oblivious Neural Network Predictions Via MiniONN Transformations", In ACM Conference on Computer and Communications Security (CCS), Oct. 2017, 13 pages.

(Continued)

*Primary Examiner* — Hosuk Song

(74) *Attorney, Agent, or Firm* — CANTOR COLBURN LLP; Anthony Mauricio Pallone

(57) ABSTRACT

Mechanisms are provided to implement an enhanced privacy deep learning system framework (hereafter "framework"). The framework receives, from a client computing device, an encrypted first subnet model of a neural network, where the first subnet model is one partition of multiple partitions of the neural network. The framework loads the encrypted first subnet model into a trusted execution environment (TEE) of the framework, decrypts the first subnet model, within the TEE, and executes the first subnet model within the TEE. The framework receives encrypted input data from the client computing device, loads the encrypted input data into the TEE, decrypts the input data, and processes the input data in (Continued)

```
Privacy Enhancing DNN Classification
Input:  img_enc    ** Encrypted image input
        fn_cfg     ** FrontNet neural network configuration
        fnw_enc    ** Encrypted FrontNet neural network weights
        bn_cfg     ** BackNet neural network configuration
        bnw        ** BackNet neural network weights
        clt        ** Client key provisioning ip

############ Within TPP (e.g., SGX Enclave) ############
** Encrypted input/Encrypted FrontNet
function ENCLAVE_LOAD_ENC_MODEL(fn_cfg, fnw_enc, clt)
      tls <- ENCLAVE_ATTESTATION(clt)
      fnw_key, img_key <- ENCLAVE_GET_KEYS(clt, tls, fnw_t, img_t)
      fnw <- ENCLAVE_DECRYPT(fnw_enc, fnw_key)
      fn <- ENCLAVE_LOAD_WEIGHTS(fn_cfg, fnw)

function ENCLAVE_INFERENCE_ENC_IMG(img_enc)
      img <- ENCLAVE_DECRYPT(img_enc, img_key)
      ir <- ENCLAVE_NETWORK_INFERENCE(fn, img)
      return ir

############ Out of TPP (e.g., SGX Enclave) ############
** Encrypted input/Encrypted FrontNet
function INF_ENC_MODEL_IMG(fn_cfg, fnw_enc, bn_cfg, bnw, img_enc, clt)
      eid <- INIT_ENCLAVE()
      ENCLAVE_LOAD_ENC_MODEL(eid, fn_cfg, fnw_enc, client)
      ir <- ENCLAVE_INFERENCE_ENC_IMG(eid, img_enc)
      bn <- LOAD_WEIGHTS(bn_cfg, bnw)
      result <- NETWORK_INFERENCE(bn, ir)
      return result
```

the TEE using the first subnet model executing within the TEE.

20 Claims, 8 Drawing Sheets

(51) Int. Cl.
*G06F 21/60* (2013.01)
*G06N 3/063* (2023.01)

(56) References Cited

U.S. PATENT DOCUMENTS

| | | | | |
|---|---|---|---|---|
| 11,443,182 | B2 * | 9/2022 | Gu | G06F 21/53 |
| 11,551,083 | B2 * | 1/2023 | Li | H04L 67/10 |
| 11,588,907 | B2 * | 2/2023 | Li | G06N 3/045 |
| 11,816,575 | B2 * | 11/2023 | Gu | G06F 21/606 |
| 11,886,989 | B2 * | 1/2024 | Gu | G06N 3/08 |
| 11,948,059 | B2 * | 4/2024 | Zhang | G06F 21/606 |
| 12,008,470 | B2 * | 6/2024 | Mireshghallah | G06N 3/08 |
| 12,367,395 | B2 * | 7/2025 | Li | H04L 41/14 |
| 2013/0117448 | A1 | 5/2013 | Nahum et al. | |
| 2018/0121936 | A1 | 5/2018 | Madduri et al. | |
| 2018/0129900 | A1 | 5/2018 | Kiraly et al. | |
| 2019/0272553 | A1 | 9/2019 | Saini et al. | |
| 2019/0392305 | A1 | 12/2019 | Gu et al. | |
| 2021/0334621 | A1 | 10/2021 | Shimizu | |

FOREIGN PATENT DOCUMENTS

| | | | |
|---|---|---|---|
| WO | WO2013/123445 | A1 | 8/2013 |
| WO | WO2018008605 | A1 | 1/2018 |
| WO | WO2018011842 | A1 | 1/2018 |

OTHER PUBLICATIONS

Mahendran, Aravindh et al., "Understanding Deep Image Representations by Inverting Them", In IEEE Conference on Computer Vision and Pattern Recognition, Jun. 2015, 9 pages.
Mckeen, Frank et al., "Innovative Instructions and Software Model for Isolated Execution", In Proceedings of the 2nd International Workshop on Hardware and Architectural Support for Security and Privacy, Jun. 2013, 8 pages.
Mcmahan, H. B. et al., "Communication-Efficient Learning of Deep Networks from Decentralized Data", Proceedings of the 20th International Conference on Artificial Intelligence and Statistics (AISTATS 2017), Apr. 20-22, 2017, 10 pages.
Mcmahan, H. Brendan et al., "Communication-Efficient Learning of Deep Networks from Decentralized Data", Feb. 2016, arXiv preprint arXiv:1602.05629, Feb. 28, 2017, 11 pages.
Mohassel, Payman et al., "SecureML: A System for Scalable Privacy-Preserving Machine Learning", In 38th IEEE Symposium on Security and Privacy, May 2017, 20 pages.
Ohrimenko, Olga et al., "Oblivious Multi-Party Machine Learning on Trusted Processors", USENIX Security Symposium '16, Aug. 10-12, 2016, 19 pages.
Osia, Seyed A. et al., "A Hybrid Deep Learning Architecture for Privacy-Preserving Mobile Analytics", arXiv, Mar. 2017, preprint arXiv:1703.02952, last revised Dec. 27, 2019, 13 pages.
Osia, Seyed A. et al., "A Hybrid Deep Learning Architecture for Privacy-Preserving Mobile Analytics", Cornell University Library, arXiv: 1703.02952v4 [cs.LG], Apr. 4, 2017, 15 pages.
Pan, Sinno J. et al., "A Survey on Transfer Learning", IEEE, Transactions on Knowledge and Data Engineering, vol. 22, Issue 10 , Oct. 2010, 15 pages.
Redmon, J., "Darknet: Open Source Neural Networks in C", http://pjreddie:com/darknet/, 2013-2016, Accessed from the Internet on Apr. 6, 2020, 5 pages.
Saltaformaggio, Brendan et al., "DSCRETE: Automatic Rendering of Forensic Information from Memory Images Via Application Logic Reuse", In USENIX Security Symposium, Aug. 2014, 16 pages.
Saltaformaggio, Brendan et al., "GUITAR: Piecing Together Android App GUIs from Memory Images", In Proceedings of the 22nd ACM SIGSAC Conference on Computer and Communications Security, Oct. 2015, 13 pages.
Saltaformaggio, Brendan et al., "VCR: App-Agnostic Recovery of Photographic Evidence from Android Device Memory Images", In Proceedings of the 22nd ACM SIGSAC Conference on Computer and Communications Security, Oct. 2015, 12 pages.
Schuster, Felix et al., "VC3: Trustworthy Data Analytics in the Cloud Using SGX", In Security and Privacy (SP), 2015 IEEE Symposium on, May 2015, 17 pages.
Shokri, Reza et al., "Privacy-Preserving Deep Learning", ACM Conference on Computer and Communications Security (CCS '15), Oct. 12-16, 2015, 12 pages.
Shwartz-Ziv, Ravid et al., "Opening the Black Box of Deep Neural Networks Via Information", arXiv preprint arXiv:1703.00810, Apr. 2017, 19 pages.
Silver, David et al., "Mastering the Game of Go with Deep Neural Networks and Tree Search", Nature, Jan. 2016, 20 pages.
Silver, David et al., "Mastering the Game of Go without Human Knowledge", Nature 550, 7676, Oct. 2017, 354-359.
Simonyan, Karen et al., "Very Deep Convolutional Networks for Large-Scale Image Recognition", CoRR abs/1409.1556, Sep. 2014, revised Apr. 10, 2015, 14 pages.
Sutskever, Ilya et al., "Sequence to Sequence Learning with Neural Networks", In Advances in Neural Information Processing Systems, Dec. 2014, 9 pages.
Tamrakar, Sandeep et al., "The Circle Game: Scalable Private Membership Test Using Trusted Hardware", In Proceedings of the 2017 ACM on Asia Conference on Computer and Communications Security, Apr. 2017, 14 pages.
Tramer, Florian et al., "Slalom: Fast, Verifiable and Private Execution of Neural Networks in Trusted Hardware", arXiv preprint arXiv:1806.03287, Jun. 2018, last revised Feb. 27, 2019, 19 pages.
Vaidya, Jaideep et al., "Privacy Preserving Association, Rule Mining in Vertically Partitioned Data", In Proceedings of the Eighth ACM SIGKDD International Conference on Knowledge Discovery and Data Mining, Jul. 2002, 6 pages.
Vaidya, Jaideep et al., "Privacy-Preserving Naive Bayes Classification", The VLDB Journal the International Journal on Very Large Data Bases, Jul. 2008, 20 pages.
Wang, Wenhao et al., "Leaky Cauldron on the Dark Land: Understanding Memory Side-Channel Hazards in SGX", In Proceedings of the 24th ACM SIGSAC Conference on Computer and Communications Security, Oct. 2017, 14 pages.
Xu, Yuanzhong et al., "Controlled-Channel Attacks: Deterministic Side Channels for Untrusted Operating Systems", In Security and Privacy (SP), 2015 IEEE Symposium on, May 2015, 17 pages.
Yosinski, Jason et al., "Understanding Neural Networks through Deep Visualization", CoRR abs/1506.06579, Jun. 2015, 12 pages.
Zeiler, Matthew D. et al., "Visualizing and Understanding Convolutional Networks", In Computer Vision—ECCV 2014—13th European Conference, Sep. 2014, 16 pages.
Zheng, Wenting et al., "Opaque: An Oblivious and Encrypted Distributed Analytics Platform", In 14th USENIX Symposium on Networked Systems Design and Implementation, Mar. 2017, 16 pages.
Office Action dated Jul. 26, 2024 received from The State Intellectual Property Office of People's Republic of China for Application No. 201980031393.3, 9 pages.
EP Examination Report dated Aug. 3, 2023 received from the European Patent Office for Application No. 19732655.6, 9 pages.
Reply to EP Examination Report dated Nov. 14, 2023 filed with the European Patent Office for Application No. 19732655.6, 3 pages.
Meng, Li et al., "PrivyNet: A Flexible Framework for Privacy-Preserving Deep Neural Network Training with a Fine-Grained Privacy Control", Cornell University Library, arXiv:1709.06161v1 [cs.LG], Sep. 18, 2017, 20 pages.
Osia, Seyed Ali et al., "A Hybrid Deep Learning Architecture for Privacy-Preserving Mobile Analytics", Cornell University Library, arXiv: 1703.02952v5 [cs.LG], Apr. 18, 2018, 21 pages.

(56) References Cited

OTHER PUBLICATIONS

Tramer, Florian et al., "Slalom: Fast, Verifiable and Private Execution of Neural Networks in Trusted Hardware", Cornell University Library, arXiv:1806.03287v1 [stat.ML], Jun. 8, 2018, 15 pages.
List of IBM Patents or Patent Applications Treated as Related, May 13, 2022, 2 pages.
Amazon AI, https://aws:amazon:com/amazon-ai/, Accessed from the Internet on Feb. 21, 2020, 26 pages.
Google Cloud AI., https://cloud:google:com/products/machine-learning/, Accessed from the Internet on Feb. 21, 2020, 10 pages.
IBM Watson, https://www:ibm:com/watson/, Accessed from the Internet on Feb. 21, 2020, 2 pages.
International Search Report and Written Opinion dated Sep. 26, 2019 for International Application No. PCT/EP2019/066636, 17 pages.
";--Have I been pwned?", https://haveibeenpwned:com/, Accessed from the Internet on Feb. 21, 2020, 3 pages.
"Darknet Reference Model", https://pjreddie:com/darknet/imagenet/#reference, Accessed from the Internet on Feb. 21, 2020, p. 5 of 6 pages.
"Extraction", https://pjreddie:com/darknet/imagenet/#extraction, Accessed from the Internet on Feb. 21, 2020, p. 5 of 6 pages.
"Intel Software Guard Extensions Remote Attestation End-to-End Example", https://software:intel:com/en-us/articles/intel-software-guard-extensions-remote-attestation-end-to-end-example, Accessed from the Internet on Feb. 21, 2020, 23 pages.
"List of Data Breaches", Wikipedia, https://en:wikipedia:org/wiki/List of data breaches, Accessed from the Internet on Feb. 21, 2020, 28 pages.
"Microsoft Azure Machine Learning", https://azure:microsoft:com/en-us/services/machine-learning/, Accessed from the Internet on Feb. 21, 2020, 19 pages.
Anati, Ittai et al., "Innovative Technology for CPU Based Attestation and Sealing", In Proceedings of the 2nd International Workshop on Hardware and Architectural Support for Security and Privacy, Jun. 2013, 7 pages.
Bengio, Yoshua et al., "Learning Long-Term Dependencies with Gradient Descent is Difficult", IEEE Transactions on Neural Networks vol. 5, No. 2, Mar. 1994, 157-166.
Boivie, Rick et al., "SecureBlue++: CPU Support for Secure Executables", Tech. Rep., IBM Research Report, Apr. 2013, 33 pages.
Brasser, Ferdinand et al., "Software Grand Exposure: SGX Cache Attacks are Practical", CoRR abs/1702.07521, Feb. 2017, 17 pages.
Brenner, Stefan et al., "Securekeeper: Confidential Zookeeper Using Intel SGX", In Proceedings of the 17th International Middleware Conference, Dec. 2016, 13 pages.
Chen, Guoxing et al., "SgxPectre Attacks: Leaking Enclave Secrets Via Speculative Execution", arXiv Preprint arXiv:1802.09085, Feb. 2018, 17 pages.
Costan, Victor et al., "Intel SGX Explained", IACR Cryptology, ePrint Archive, Report 86, Mar. 2016, pp. 1-60.
Costan, Victor et al., "Intel SGX Explained", IACR Cryptology, ePrint Archive, Report 86, Mar. 2016, pp. 61-118.
Deng, Jia et al., "ImageNet: A Large-Scale Hierarchical Image Database", IEEE Conference on In Computer Vision and Pattern Recognition. CVPR Jun. 2009, 8 pages.
Dosovitskiy, Alexey et al., "Inverting Visual Representations with Convolutional Networks", In IEEE Conference on Computer Vision and Pattern Recognition, arXiv:1506.02753v4, Apr. 2016, 9 pages.
Dowlin, Nathan et al., "CryptoNets: Applying Neural Networks to Encrypted Data with High Throughput and Accuracy", Proceedings of the 33rd International Conference on Machine Learning, JMLF: W&CP vol. 48, Jun. 19-24, 2016, 10 pages.
Du, Wenliang et al., "Privacy-Preserving Multivariate Statistical Analysis: Linear Regression and Classification", In Proceedings of the 2004 SIAM International Conference on Data Mining, Apr. 2004, 12 pages.
Fuhry, Benny et al., "Hardidx: Practical and Secure Index with SGX", In Data and Applications Security and Privacy XXXI: 31st Annual IFIP WG 11.3 Conference Jul. 2017, arXiv:1703.04583v1, Mar. 14, 2017, 16 pages.
Gentry, Craig, "A Fully Homomorphic Encryption Scheme", Stanford University, Sep. 2009, pp. i-90.
Gentry, Craig, "A Fully Homomorphic Encryption Scheme", Stanford University, Sep. 2009, pp. 91-199.
Gilad-Bachrach, Ran et al., "CryptoNets: Applying Neural Networks to Encrypted Data with High Throughput and Accuracy", In Proceedings of the 33rd International Conference on Machine Learning, Jun. 2016, 10 pages.
Glorot, Xavier et al., "Understanding the Difficulty of Training Deep Feedforward Neural Networks", In Proceedings of the Thirteenth International Conference on Artificial Intelligence and Statistics, May 2010, pp. 249-256.
Gotzfried, Johannes et al., "Cache Attacks on Intel SGX", In Proceedings of the 10th European Workshop on Systems Security, Apr. 2017, 6 pages.
Graves, Alex et al., "Speech Recognition with Deep Recurrent Neural Networks", 38th International Conference on Acoustics, Speech and Signal Processing (ICASSP), 2013 IEEE, pp. 6645-6649, May 26-31, 2013. 5 pages.
Gu, Zhongshu et al., "Securing Input Data of Deep Learning Inference Systems via Partitioned Enclave Execution", arXiv:1807.00969v1, Jul. 2018, 14 pages.
Gupta, Debayan et al., "Using Intel Software Guard Extensions for Efficient Two-Party Secure Function Evaluation", In International Conference on Financial Cryptography and Data Security Feb. 2016, 16 pages.
Hahnel, Marcus et al., "High-Resolution Side Channels for Untrusted Operating Systems", In 2017 USENIX Annual Technical Conference, Jul. 2017, 15 pages.
Hannun, Awni et al., "Deep Speech: Scaling Up End-to-End Speech Recognition", CoRR abs/1412.5567, Jul. 2014, arXiv: 1412.5567v2, Dec. 19, 2014, 12 pages.
He, Kun et al., "A Powerful Generative Model Using Random Weights for the Deep Image Representation", In Advances in Neural Information Processing Systems, Dec. 2016, 9 pages.
He, Kaiming et al., "Deep Residual Learning for Image Recognition", In IEEE Conference on Computer Vision and Pattern Recognition, Jun. 2016, 9 pages.
Hinton, Geoffrey et al., "Deep Neural Networks for Acoustic Modeling in Speech Recognition: The Shared Views of Four Research Groups", IEEE Signal Processing Magazine, Nov. 2012, 16 pages.
Hinton, Geoffrey et al., "Reducing the Dimensionality of Data with Neural Networks", Science 313, 5786, Jul. 2006, 5 pages.
Huang, Gao et al., "Densely Connected Convolutional Networks", In Proceedings of the IEEE Conference on Computer Vision and Pattern Recognition, Jul. 2017, 9 pages.
Hunt, Tyler et al., "Chiron: Privacy-Preserving Machine Learning as a Service", arXiv preprint arXiv:1803.05961, Mar. 2018, 15 pages.
Jagannathan, Geetha et al., "Privacy-Preserving Distributed K-Means Clustering over Arbitrarily Partitioned Data", In Proceedings of the Eleventh ACM SIGKDD International Conference on Knowledge Discovery in Data Mining, Aug. 2005, 7 pages.
Johnson, Simon et al., "Intel Software Guard Extensions: EPID Provisioning and Attestation Services", Intel Corporation, 2016, pp. 1-10.
Kaplan, David et al., "AMD Memory Encryption", White Paper, Tech. rep., Apr. 2016, 12 pages.
Krizhevsky, Alex et al., "ImageNet Classification with Deep Convolutional Neural Networks", NIPS'12 Proceedings of the 25th International Conference on Neural Information Processing Systems—vol. 1, Lake Tahoe, Nevada—Dec. 3-6, 2012, 9 pages.
Küçük, Kubilay et al., "Exploring the Use of Intel SGX for Secure Many-Party Applications", In Proceedings of the 1st Workshop on System Software for Trusted Execution, Dec. 2016, 6 pages.
Lee, Sangho et al., "Inferring Fine-Grained Control Flow Inside SGX Enclaves with Branch Shadowing", In 26th USENIX Security Symposium, Aug. 2017, 19 pages.

(56) References Cited

OTHER PUBLICATIONS

Li, Meng et al., "PrivyNet: A Flexible Framework for Privacy-Preserving Deep Neural Network Training", Cornell University Library, arXiv:1709.06161v3 [cs.LG] , Jan. 12, 2018, pp. 1-20.
Lindell, Yehuda et al., "Privacy Preserving Data Mining", In Advances in Cryptology, CRYPTO 2000, Aug. 2000, 19 pages.
Decision of Rejection dated Sep. 13, 2024 received from the National Intellectual Property Administration, PRC for Application No. 201980031393.3, 10 pages.
Notice of Reasons for Refusal dated Sep. 28, 2022 for Japanese Patent Application No. 2020-558008, 3 pages.

* cited by examiner

Privacy Enhancing DNN Classification

```
Input:  img_enc        ** Encrypted image input
        fn_cfg         ** FrontNet neural network configuration
        fnw_enc        ** Encrypted FrontNet neural network weights
        bn_cfg         ** BackNet neural network configuration
        bnw            ** BackNet neural network weights
        clt            ** Client key provisioning ip
```

```
########### Within TPP (e.g., SGX Enclave) ###########
** Encrypted Input/Encrypted FrontNet
function ENCLAVE_LOAD_ENC_MODEL(fn_cfg, fnw_enc, clt)
    tls <- ENCLAVE_ATTESTATION(clt)
    fnw_key, img_key <- ENCLAVE_GET_KEYS(clt, tls, fnw_t, img_t)
    fnw <- ENCLAVE_DECRYPT(fnw_enc, fnw_key)
    fn <- ENCLAVE_LOAD_WEIGHTS(fn_cfg, fnw)

function ENCLAVE_INFERENCE_ENC_IMG(img_enc)
    img <- ENCLAVE_DECRYPT(img_enc, img_key)
    ir <- ENCLAVE_NETWORK_INFERENCE(fn, img)
    return ir

########### Out of TPP (e.g., SGX Enclave) ###########
** Encrypted Input/Encrypted FrontNet
function INF_ENC_MODEL_IMG(fn_cfg, fnw_enc, bn_cfg, bnw, img_enc, clt)
    eid <- INIT_ENCLAVE()
    ENCLAVE_LOAD_ENC_MODEL(eid, fn_cfg, fnw_enc, client)
    ir <- ENCLAVE_INFERENCE_ENC_IMG(eid, img_enc)
    bn <- LOAD_WEIGHTS(bn_cfg, bnw)
    result <- NETWORK_INFERENCE(bn, ir)
    return result
```

*FIG. 1*

PRIVACY ENHANCING DEEP LEARNING CLOUD SERVICE USING A TRUSTED EXECUTION ENVIRONMENT

BACKGROUND

The present application relates generally to an improved data processing apparatus and method and more specifically to mechanisms for enhancing data privacy in deep learning cloud services by utilizing a trusted execution environment.

Deep learning systems have been widely deployed as part of artificial intelligence (AI) services due to their ability to approach human performance when performing cognitive tasks. Deep learning is a class of machine learning technology that uses a cascade of multiple layers of nonlinear processing units for feature extraction and transformation. Each successive layer uses the output from the previous layer of input. The deep learning system is trained using supervised, e.g., classification, and/or unsupervised, e.g., pattern analysis, learning mechanisms. The learning may be performed with regard to multiple levels of representations that correspond to different levels of abstraction, with the levels forming a hierarchy of concepts.

Most modern deep learning models are based on an artificial neural network, although they can also include propositional formulas or latent variables organized layer-wise in deep generative models such as the nodes in Deep Belief Networks and Deep Boltzmann Machines. In deep learning, each level learns to transform its input data into a slightly more abstract and composite representation. In an facial image recognition application, for example, the raw input may be a matrix of pixels with the first representational layer abstracting the pixels and encoding edges, the second layer composing and encoding arrangements of edges, the third layer encoding a nose and eyes, and the fourth layer recognizing that the image contains a face. Importantly, a deep learning process can learn which features to optimally place in which level on its own, but this does not completely obviate the need for hand-tuning. For example, hand tuning may be used to vary the number of layers and layer sizes so as to provide different degrees of abstraction.

The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs is that of the network and is the number of hidden layers plus one (as the output layer is also parameterized). For recurrent neural networks, in which a signal may propagate through a layer more than once, the CAP depth is potentially unlimited. No universally agreed upon threshold of depth divides shallow learning from deep learning, but most researchers agree that deep learning involves a CAP depth greater than 2. CAP of depth 2 has been shown to be a universal approximator in the sense that it can emulate any function. Beyond that, more layers do not add to the function approximator ability of the network, but the extra layers help in learning features.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions that are executed by the at least one processor to configure the at least one processor to implement an enhanced privacy deep learning system framework. The method comprises receiving, by the enhanced privacy deep learning system framework from a client computing device, an encrypted first subnet model of a neural network, where the first subnet model is one partition of multiple partitions of the neural network. The method further comprises loading, by the enhanced privacy deep learning system framework, the encrypted first subnet model into a trusted execution environment of the enhanced privacy deep learning system framework. Moreover, the method comprises decrypting, by the enhanced privacy deep learning system framework, the first subnet model within the trusted execution environment and executing the first subnet model within the trusted execution environment. In addition, the method comprises receiving, by the enhanced privacy deep learning system framework, encrypted input data from the client computing device, and loading, by the enhanced privacy deep learning system framework, the encrypted input data into the trusted execution environment. Furthermore, the method comprises decrypting and processing, by the enhanced privacy deep learning system framework, the input data in the trusted execution environment using the first subnet model executing within the trusted execution environment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram outlining an algorithm for implementing privacy-enhancing deep neural network (DNN) classification in a privacy enhancing deep learning cloud service in accordance with one illustrative embodiment;

DETAILED DESCRIPTION

Figure 2:
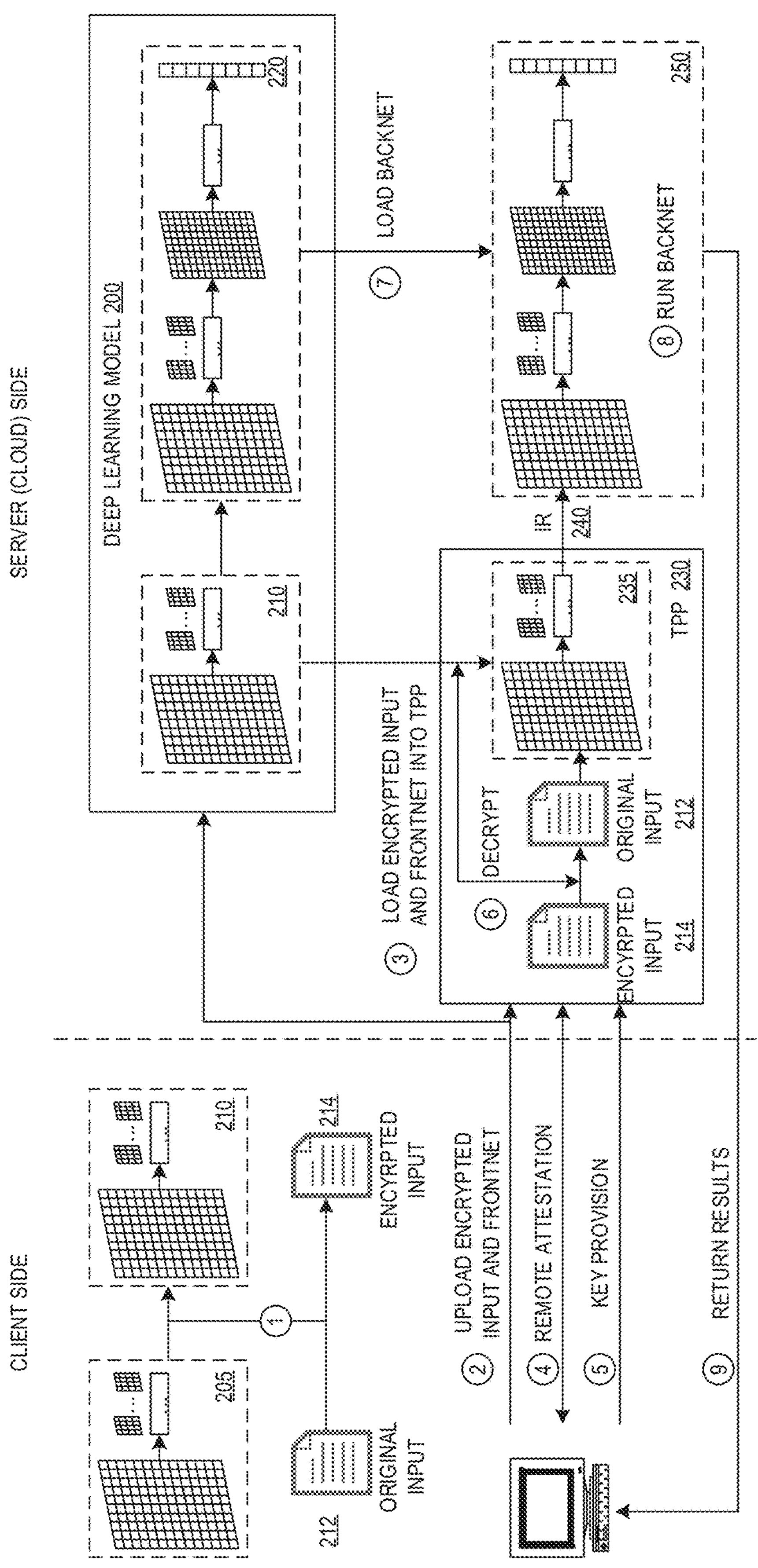
FIG. 2 is a block diagram outlining an example interaction between multiple components of a privacy enhancing deep learning cloud service in accordance with one illustrative embodiment.

While deep learning, or artificial intelligence (AI), systems and services utilize deep learning systems as part of their backend engines, concerns still exist regarding the confidentiality of the end users' provisioned input data, even for those reputable deep learning or AI service providers. That is, there is concern that accidental disclosure of sensitive user data might unexpectedly happen due to security breaches, exploited vulnerabilities, neglect, or insiders.

Deep learning, or AI, cloud providers generally offer two independent deep learning (DL) services, i.e., training and inference. End users can build customized DL models from scratch by feeding training services with their own training data. In cases where the end users do not possess enough training data, they can also leverage transfer learning techniques to repurpose and retrain existing models targeting similar tasks. After obtaining their trained models, end users can upload the models, which are in the form of hyperparameters and weights of deep neural networks (DNNs), to inference services (which might be hosted by different AI service providers as of training services) to bootstrap their AI cloud application programming interfaces (APIs). These APIs can be further integrated into mobile or desktop applications. At runtime, end users can invoke the remote APIs with their input data and receive prediction results from inference services.

Although end users always expect that service providers should be trustworthy and dependable, they may still have some concerns about the data privacy of their inputs. Accidental disclosures of confidential data might unexpectedly occur due to malicious attacks, mis-operations by negligent system administrators, or data thefts conducted by insiders. Adversaries with escalated privileges may be able to extract sensitive data from disks (data-at-rest) or from main memory (runtime data). Numerous data breaches of these types have been observed in recent years. Similar incidents can also happen to user input data for AI cloud services. In addition, deep learning is often differentiated by processing raw input data, such as images, audio, and video, as opposed to hand-crafted features. This poses more privacy concerns if the input data is leaked or compromised.

The illustrative embodiments provide a privacy enhancing mechanism to mitigate sensitive information disclosure in deep learning systems, also referred to as deep learning inference pipelines. The illustrative embodiments partition deep learning inference pipelines into a FrontNet neural network model (referred to herein as a "FrontNet") and a BackNet neural network model (referred to herein as a "BackNet"), leveraging trusted execution environment techniques on cloud infrastructures to cryptographically protect the confidentiality and integrity of user inputs in the FrontNet model. The illustrative embodiments allow users to define the partition point between FrontNet and BackNet. In some illustrative embodiments, automated mechanisms are provided to allow for automated determination of the partition point between FrontNet and BackNet such that there is a balance between the privacy protection of the user inputs and the performance requirements of the deep learning inference pipeline. The resulting privacy enhancing mechanism of the illustrative embodiments achieves a maximum privacy guarantee with acceptable performance overhead.

Based on the layered structure of deep learning inference pipelines, or deep learning neural networks, the illustrative embodiments partition the deep learning neural network into two independent subnet models, as noted above, which are referred to as a FrontNet and a BackNet, respectively. Mathematically, a deep neural network (DNN) can be defined as a function $F^*$ that maps the input x to the output y, i.e., $y=F^*(x;\theta)$, where $\theta$ stands for the parameters that are learned in the training phase when training the DNN. The function $F^*$ is composed of n (assuming the network has n layers) sub-functions $D_i$ where $i\in[1, n]$. $F_i$ maps the input $x_i$ to the output $y_i$ on Layer i. These sub-functions are connected in a chain. Thus, $y=F^*(x;\theta)=F_nF_{n-1}\ldots F_1(x)$. After partitioning the DNN at the m-th layer where $m\in[1, n]$, the function for the FrontNet subnet model can be represented as $\Phi: X\rightarrow IR$. X is the input space applicable for a specific deep neural network and IR is the output space for the intermediate representations (IRs).

$IR=\Phi(x;\theta_\Phi)=F_mF_{m-1}\ldots F_1(x)$ and its output IR is the intermediate representation (intermediate feature maps) computed out of the FrontNet subnet model. The function $\lambda$ for the BackNet subnet model is $\lambda(IR;\theta_\lambda)=F_nF_{n-1}\ldots F_{m+1}(IR)$, in which IR is the input to the BackNet subnet model from the FrontNet subnet model.

It is assumed that the adversaries that may try to gain unauthorized access to the end users input to the FrontNet subnet model may have some background knowledge B for reconstructing the sensitive original input x. The background knowledge includes: (1) the domain knowledge of user inputs, e.g., input file types, natural image priors; (2) the knowledge of the distribution of all bits of x, which can be described by a probability matrix $P=\{\ldots, p_{ij}, \ldots\}$, where $p_{ij}$ is the probability that the i-th bit of x takes the value j, $1\le i\le|x|$ and $j\in\Omega$, where $\Omega$ is the encoding alphabet, and $\forall i$, $\Sigma_j\, p_{ij}=1$.

Adversaries aim to reconstruct the inference input x: given an $IR\in IR$ of x, and the background knowledge B. Adversaries can devise an attack strategy A to return $\tilde{x}$, the reconstructed version of x. The attack strategy A can span from visually perceiving the intermediate representations to leveraging advanced input reconstruction techniques by approximating the inverse model. The FrontNet subnet model representation function $\Phi(\bullet)$ is considered to violate the ε-privacy for x, if there exists an attack A, background knowledge B, and intermediate representation IR, $$\frac{dist[x, \tilde{x} \mid \tilde{x} \leftarrow A(B, IR)]}{dist[x, \tilde{x} \mid \tilde{x} \leftarrow A(B)]} \le \varepsilon; \tag{1}$$

where $\varepsilon$ is the privacy parameter to bound the distances between x and $\tilde{x}$ before and after observing IR and $\varepsilon \in [0\ 1]$. The dist measures the distance between an original input x and a reconstructed input $\tilde{x}$. Specifically, $dist[x, \tilde{x}|\tilde{x} \leftarrow (B)]$ considers that $\tilde{x}$ is reconstructed only based on the adversaries' background knowledge B, whereas in $dist[x, \tilde{x}|\tilde{x} \leftarrow A(B, IR)]$, $\tilde{x}$ is reconstructed based on both the adversaries' background knowledge B and the observed IR. Equation 1 states that the privacy of the true inference input x is breached if adversaries can significantly reduce the distance between ˜x and x after obtaining the intermediate representation IR of x.

As defined above, the representation function for a FrontNet subnet mode is $IR=\Phi(x; \theta_\Phi)$ and a BackNet is $y^*=\lambda(\Phi(x; \theta_\Phi); \theta_\lambda)$. The parameter $\theta$ of the original DNN is divided into $\theta_\Phi$ and $\theta_\lambda$ according to the network partition. The output shape of a FrontNet subnet model is compatible with the input shape of its corresponding BackNet subnet model. IR is delivered as an output for the FrontNet subnet model and is an input to the subsequent BackNet subnet model which continues the computation to get a result y*. Given the same input x, it is expected that y* should be equivalent to y, which is the output of the original DNN before the partition.

On the cloud side, the FrontNet subnet model (or simply "FrontNet"), and inputs from end users, are loaded into a Trusted Execution Environment (TEE) that can guarantee the confidentiality, integrity, and freshness of the protected memory for secure remote computation. In one illustrative embodiment, the TEE may be provided by an implementation of the Intel SGX enclave. However, the illustrative embodiments are not limited to SGX enclave and may be implemented with any suitable TEE, such as Protected Execution Facility for IBM Power Systems, and Secure Service Container for IBM Z Systems, ARM TrustZone, and AMD Secure Memory Encryption and Secure Encrypted Virtualization, for example. With the protection of the memory access control mechanism and memory encryption engine (MEE) of the TEE, all non-TEE accesses from privileged system software or other untrusted components of systems will be denied. Thus, the computational process of the user inputs with the FrontNet is kept within the perimeter of a specific CPU package and is invisible to the external world. The computation within an TEE is still naturally dedicated to distilling features for specific inference tasks, just exhibiting the same behaviors as its counterpart running outside of the TEE. Furthermore, the TEE can attest to remote parties (i.e., the end users of AI cloud services) that the FrontNet is running in a secure environment hosted by a trusted hardware platform.

In order to protect the contents of user inputs from being exposed on cloud servers, end users may encrypt inputs with their symmetric keys and upload the encrypted files to cloud services. After finishing the remote attestation with the TEE, end users can provision the symmetric keys to the TEE via a secure communication channel. The mechanisms inside the TEE then decrypt the user inputs and pass the inputs to the FrontNet subnet model, which has been loaded in the same TEE. In addition, the illustrative embodiments may leverage an authenticated encryption mechanism, such as the Galois Counter Mode (GCM) for example, or any of a variety of other authenticated encryption mechanisms, to achieve authenticated encryption. Thus, the illustrative embodiments can authenticate legitimate end users and render service abusing attacks ineffective. For adversaries who tend to treat the TEE implemented FrontNet subnet model as a black-box service and use queries to extract model information, they would need to encrypt their inputs with the proper symmetric keys from the legitimate end users. Assuming that end users' keys are not leaked, the illustrative embodiments can deny serving these illegitimate requests that fail the integrity check and prevent the leakage of the FrontNet subnet model information, which is considered to be crucial for reconstructing user inputs. By protecting the confidentiality of both user inputs and the FrontNet subnet model via encryption and the implementation of the FrontNet subnet model in the TEE, all state-of-the-art input reconstruction methods will no longer be effective.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1 and 2 are example diagrams illustrating one illustrative embodiment of a privacy enhancing deep learning cloud service in accordance with one illustrative embodiment. FIG. 1 is an example diagram outlining an algorithm for implementing privacy-enhancing deep learning neural network (DNN) classification in a privacy enhancing deep learning cloud service in accordance with one illustrative embodiment. FIG. 2 is a block diagram outlining an example interaction between multiple components of a privacy enhancing deep learning cloud service in accordance with one illustrative embodiment. An example operation of a privacy enhancing deep learning cloud service in accordance with one illustrative embodiment will be described with reference to both FIGS. 1 and 2 hereafter.

As shown in FIGS. 1 and 2, the workflow of an example illustrative embodiment of a privacy enhancing deep learning cloud service involves an end user, at a client computing device side (left side of FIG. 2) providing both encrypted inputs and a pre-trained model 200 with an original FrontNet subnet model 105 that is encrypted using a symmetric key encryption or other encryption methodology to thereby generate the encrypted FrontNet subnet model 210. It should be noted that FIG. 2 illustrates the client-side operation as only providing the encrypted FrontNet subnet model 210 and encrypted input data to the privacy enhancing deep learning cloud service (right side of FIG. 2), however this is assuming an embodiment in which the BackNet subnet model 220 has already been provided by the client side operation and loaded into the privacy enhancing deep learning cloud service server computing device(s). It should be appreciated that the BackNet subnet model 220 need not be encrypted, as previously mentioned above.

Thus, the end user partitions the pre-trained deep learning model 200, e.g., a DNN or other AI model, into a FrontNet subnet model 210 and a BackNet subnet model 220. The point at which the pre-trained deep learning model (e.g., DNN or other AI model) is partitioned may be determined manually by the end user via their client computing device, or by way of an automated mechanism executing on the client computing device, such as the automated partitioning mechanism of the illustrative embodiments as described hereafter. The FrontNet subnet model 210 is kept secret and encrypted with a symmetric key associated with the end user (step 1 in FIG. 2). As mentioned above, the BackNet subnet model 220 need not be protected through such secrecy and encryption and instead the configuration and weights of the BackNet subnet model 220 may be shared with the privacy enhancing deep learning cloud service provider. However, in some illustrative embodiments, the BackNet subnet model 220 may also be maintained secret and encrypted either with the same symmetric key or another encryption key or encryption methodology. In the depicted example, the BackNet subnet model 220 is not secret and encrypted, or executed within the trusted execution environment (TEE) 230, due to performance constraints. However, if these performance constraints are lifted, or relaxed, it is possible that the parametric data of the BackNet subnet model 220 may also be protected in a similar manner to that of the FrontNet subnet model 210. Standard encryption mechanisms and protocols may be used to protect the BackNet subnet model 220 in communication and at rest.

Thus, in some illustrative embodiments, the whole deep neural network may be encrypted and executed within a TEE 230. In the depicted example embodiments, the deep neural network (DNN) is partitioned due to (1) the memory size limitation of the TEE 230, (2) additional performance overhead of code execution in the TEE 230, and (3) there being no additional privacy benefit by enclosing more layers (beyond the optimal partitioning point) within the TEE 230. Moreover, by executing the BackNet subnet model 220 outside the TEE 230 in the example embodiments, the framework allows for leveraging the AI-accelerated hardware, e.g., GPU, to boost the deep learning performance.

In addition to the FrontNet subnet model 210, the end user, at the client computing device, also encrypts the original inputs 212 with the symmetric key to generate encrypted input 214 for transmission to the privacy enhancing deep learning cloud service server computing device for processing by the encrypted FrontNet subnet model 210 which will execute in the TEE 230 (step 1 of FIG. 2). In the depicted example, it is assumed that the privacy enhancing deep learning cloud service provides an image classification service such that the example inputs shown in FIG. 2 are an original image 212 which is then encrypted with the symmetric key to generate the encrypted image 214 which is actually transmitted securely to the privacy enhancing deep learning cloud service server computing systems (hereafter simply referred to as the deep learning cloud service).

The end user, via the client computing device, uploads the encrypted FrontNet subnet model 210 to the deep learning cloud service on the cloud (step 2 in FIG. 2). The end user need only provide the encrypted FrontNet subnet model 210 once to the deep learning cloud service in order to initiate the deep learning cloud service. After providing the FrontNet subnet model 210, the deep learning cloud service loads the FrontNet subnet model 210 into the TEE 230 which executes in a secure manner to process encrypted inputs. Thus, the end user, via the client computing device, can continuously upload encrypted inputs 214 for processing by the deep learning cloud service, e.g., upload a plurality of encrypted images for image classification.

On the cloud side, after receiving the encrypted input 214 and the encrypted FrontNet model 210, the privacy enhancing deep learning cloud service instantiates a trusted execution environment (TEE) 230. In one illustrative embodiment, as shown in FIG. 1, the TEE 230 is an Intel SGX enclave that is initiated using the command INIT ENCLAVE at line 17 of the pseudocode shown in FIG. 1, and loads the encrypted FrontNet subnet model 210 (ENCLAVE_LOAD_ENC_MODEL at line 18 of FIG. 1) into the enclave (TEE 230) (step 3 in FIG. 2). The deep learning cloud service invokes the deep learning cloud service API function, e.g., the image classification API function in this example embodiment (ENCLAVE_INFERENCE_ENC_EVIG at line 19 in FIG. 1), and securely copies the encrypted input 214 into the enclave (TEE 230) as the function argument.

The end user, via the client computing device, and the TEE 230, e.g., SGX enclave, may perform a remote attestation procedure (step 4 in FIG. 2). The TEE 230 (e.g., SGX enclave) can prove to the end user that it is running on top of a trusted hardware platform with legitimate code/data from a trusted cloud service provider using a standard attestation protocol. Alternatively, a Transport Layer Security (TLS) session may be instantiated directly between the end user's client computing device and the TEE 230.

After creating a secure Transport Layer Security (TLS) communication channel, the end user, via the client computing device, can provision symmetric keys (ENCLAVE_GET_KEYS at line 5 of FIG. 1) directly into the TEE 230 on the cloud (step 5 in FIG. 2). Inside the TEE 230, the integrity of both the FrontNet subnet model 210 and the input 214 are verified by checking their GCM authentication tags, for example, or performing other authentication/verification operations, and the FrontNet subnet model 210 is decrypted (ENCLAVE_DECRYPT at line 6 of FIG. 1) along with the input 214 (ENCLAVE_DECRYPT at line 10 of FIG. 1) using the provisioned symmetric keys from the end user (step 6 in FIG. 2).

A deep neural network 235 is built at the deep learning cloud service server computing system based on the FrontNet subnet model 210 (ENCLAVE_LOAD_WEIGHTS at line 7 of FIG. 1), and the deep neural network 235 is passed the decrypted input, i.e. the original input 212 (ENCLAVE_NETWORK_INFERENCE at line 11 in FIG. 1), to thereby generate the IR 240 from the processing of the decrypted input 212 by the FrontNet subnet model 210. The generated IR 240 is securely copied out of the TEE 230, or enclave, through a controlled channel of the TEE 230.

Another deep neural network 250 is built based on the BackNet subnet model 220 (LOAD_WEIGHTS at line 20 in FIG. 1) (step 7 in FIG. 2). The IR 240 is input into the deep neural network 250 built based on the BackNet subnet model 220 which processes the IR 240 input (step 8 in FIG. 2) and a final analysis result is generated, e.g., a final image classification result (NETWORK_INFERENCE at line 21 in FIG. 1) (step 9 in FIG. 2). In some illustrative embodiments, the final result is an N-dimensional real-value vector that represents a probability distribution over N different possible classes. Based on the desired implementation, the privacy enhancing deep learning cloud service may select the top-k classes with their corresponding probabilities to return back to the end user via their client computing device.

Thus, the privacy enhancing deep learning system, which may be implemented as a privacy enhancing deep learning cloud service or other AI based cloud service, via deep neural network model partitioning, encryption, and execution of a FrontNet subnet model of the partitioned model in a trusted execution environment, minimizes sensitive information disclosure of user inputs. The partitioning of the deep neural network model exploits the layered compositional network structure. The trusted execution environment protects the confidentiality of both user inputs and the configuration of the deep neural network layers of the FrontNet subnet model. The mechanisms of the illustrative embodiments, by design, can render existing state-of-the-art input reconstruction techniques ineffective, thereby eliminating the channels for adversaries to invert the deep neural networks and reconstruct the inputs to the deep neural networks.

As mentioned previously, one of the features of the illustrative embodiments is the partitioning of a deep neural network (DNN) into a FrontNet subnet model and a BackNet subnet model. Again, this may be a manual partitioning performed by the end user at their client computing device based the end users' determination of the desired level of privacy protection. That is, enclosing additional layers of the DNN in a trusted execution environment can provide more privacy protection. The end user may test the DNN by providing input data and generating all intermediate representations (IRs) for all layers. The end user can then inspect the IRs with human perception to determine at which intermediate layer of the DNN the IRs do not contain sensitive information anymore. This may then be chosen as the partition point such that the input layer and layers up to and including the layer at which sensitive information is no longer present are contained in the FrontNet subnet model and the remainder of the DNN is contained in the BackNet subnet model, including the output layer.

Alternatively, an automated partitioning tool may be provided by the privacy enhancing deep learning system of the privacy enhancing deep learning cloud service or other AI based cloud service, for determining an optimal partitioning point at which to partition the layers of a deep learning system, e.g., the deep neural network of the deep learning system. The automated partitioning tool may be provided by the cloud service and may be downloadable to the client computing device for local execution at the client computing device. In this way, the end users' pre-trained model may be processed by the automated partitioning tool at the client computing device so as to identify the FrontNet subnet model and the BackNet subnet model. The client computing device may then encrypt the FrontNet subnet model and provide both the FrontNet subnet model and the BackNet subnet model to the privacy enhancing deep learning cloud service for instantiation of the FrontNet subnet model in the trusted execution environment, and the BackNet subnet model outside the trusted execution environment.

The automated partitioning tool addresses the problem of determining the optimal partitioning points for deep neural networks (DNNs) via a comprehensive security analysis. The security analysis simulates two hypothetical adversaries, A1 and A2, within a privacy reconstruction attack framework, where the adversaries tend to uncover the contents of original raw input x after obtaining IRs out of the trusted execution environment (TEE). Both adversaries are assumed to have no prior knowledge of input x, i.e., probability matrix P holds the uniform distribution and $$\forall\, i,\ p_{ij} = \frac{1}{|\Omega|},$$

but they have different (from weak to strong) attack strategies A:

A1: This adversary is able to view IRs generated out of the FrontNet subnet model. The strategy A is to pick the IR that reveals the most information of the original input. The information exposure is measured by assessing IRs at different partitioning layers of a DNN.

A2: In addition to viewing the IRs, this more advanced adversary can further master these input reconstruction techniques for deep neural networks. Thus, the strategy A of the adversary is to derive an inverse function $\phi^{-1}$ from $\Phi$ and compute $\tilde{x}=\phi^{-1}(IR)$. The reconstructed $\tilde{x}$ may leak the information of the original input x, however the privacy enhancing deep learning cloud service or other AI based cloud service of the illustrative embodiments, by design, can render such attack ineffective.

It is assumed that the adversary A1 is able to retrieve the IR data of the hidden layers located outside of the TEE, i.e. in the BackNet subnet model, even though the IRs may only reside in the computer memory. Therefore, it is important to investigate whether this adversary can perceive and infer the contents of the original inputs by viewing the IRs.

In deep neural networks, IRs are organized in the form of stacked feature maps. Assuming an image processing implementation, the automated partitioning tool projects all feature maps back to the pixel space and stores them as IR images. For example, if a convolutional layer of a model has 64 filters and the output is a 112×112×64 tensor, 64 IR images may be generated (112 in width and 112 in height) from the model's output.

One method to simulate this adversary is to let human subjects view all IR images and pick the ones that reveal the original input x's information. However, this task is tedious and error-prone for human beings considering the quantity of IR images they need to inspect, and is also difficult to quantify the distance between x and IRs. Instead, the automated partitioning tool of the illustrative embodiments, replaces human subjects with another convolutional neural network that automatically assess all IR images and identifies the ones revealing the most input information at each layer. This approach is based on the insight that if an IR image retains similar content as the input image, it will be classified into similar categories with the same convolutional network. By measuring the similarity of classification results, the automated partitioning tool can deduce whether a specific IR image is visually similar to its original input. End users can further leverage the assessment results to determine the optimal partitioning points for different neural network architectures.

Figure 3:
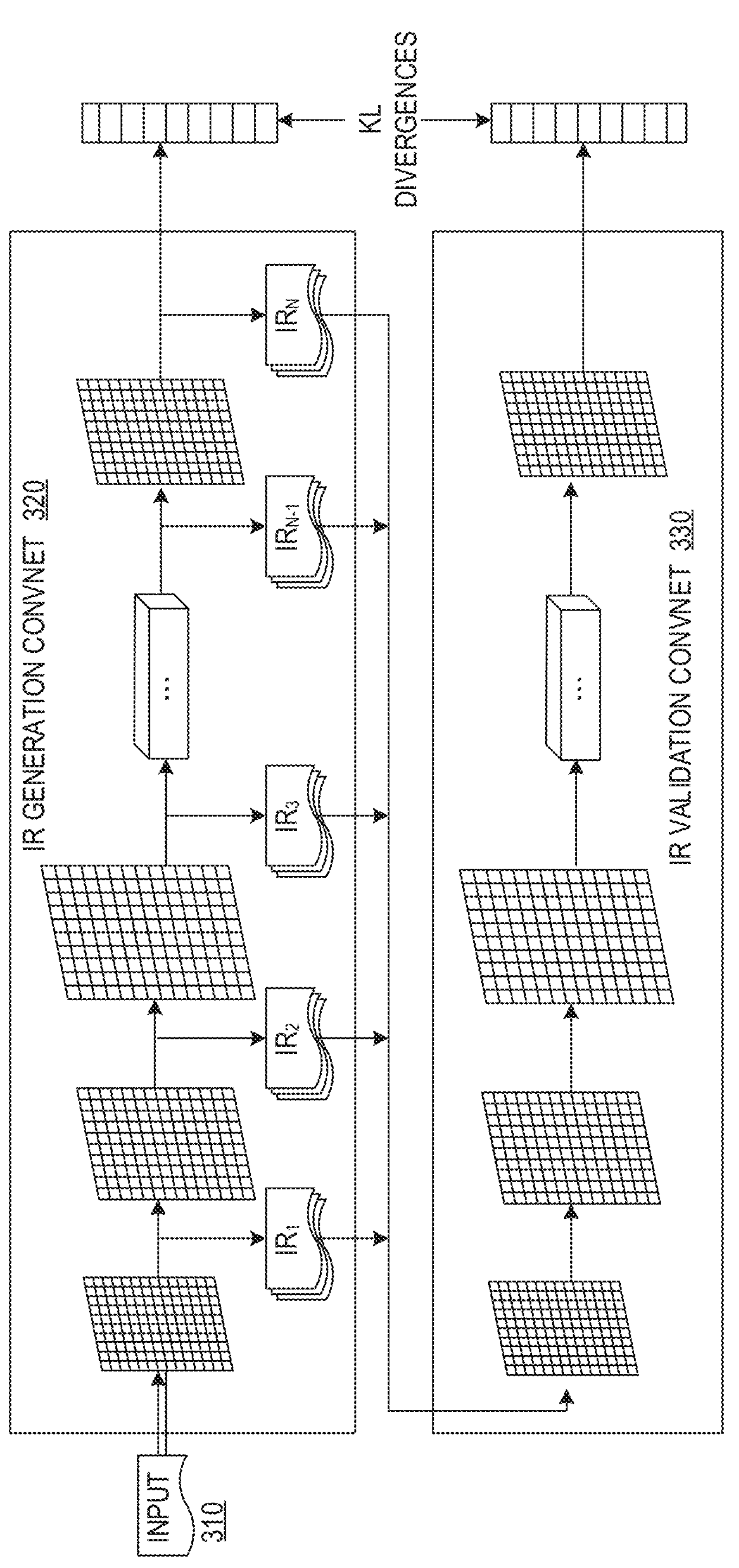
FIG. 3 is an example diagram illustrating a dual convolutional neural network architecture for a neural network assessment framework of an automated partitioning tool in accordance with one illustrative embodiment.

FIG. 3 is an example diagram illustrating a dual convolutional network architecture for a neural network assessment framework of an automated partitioning tool in accordance with one illustrative embodiment. As shown in FIG. 3, an input x 310 is submitted to the IR generation convolutional network (IRGenNet) 320, which generates $IR_i i \in [1, n]$. Each $IR_i$ contains multiple feature maps after passing Layer i ($L_i$). The feature maps are projected to IR images and submitted to the IR validation convolutional network (IRValNet) 330, which shares the same network architecture/weights as the IRGenNet 320. The outputs of both convolutional networks 320 and 330 are N-dimensional (N is the number of classes) probability vectors with class scores.

In some illustrative embodiments, the Kullback-Leibler (KL) divergence is used to measure the similarity of classification results, although other similarity metrics may be used without departing from the spirit and scope of the present invention. With the KL divergence, at each Layer i, the IR image with the minimum KL divergence $D_{KL}$ with the input x is selected to quantitatively measure the dist[x, $IR_i$]:$\forall_j \in$ [1, filternum(Li)], $$dist[x, IR_i] = \min_j(D_{KL}(F^*(x, \theta) \| F^*(IR_{ij}, \theta))) = \min_j\left(\sum_k F^*(x, \theta)_k \log\frac{F^*(x, \theta)_k}{F^*(IR_{ij}, \theta)_k}\right) \tag{2}$$

where F*(., θ) is the representation function shared by both IRGenNet 320 and IRValNet 330. To determine the optimal partitioning point for each neural network, $D_{KL}(F^*(x, \theta) \| \mu)$ is computed where μ~U(0, N), the uniform distribution of the probability vector and N is the number of classes. This represents that A1 has no prior knowledge of x before obtaining IRs and considers that x will be classified to all classes with equal chance. Based on Eq. 1 above, $$\delta_i = \frac{dist[x, IR_i]}{D_{KL}(F^*(x, \theta) \| \mu)}$$

may be computed and $\delta_i$ may be compared with the user-specified ε bound. For example, if the user chooses ε=1, to avoid violating ε-privacy, it is safe to partition at Layer i only if $\delta_i$>ε=1. It is worth noting that comparison with the uniform distribution with ε=1 is a very tight privacy bound for the information exposure. In the real-world scenario, end users can relax the constraint to specify their specific ε∈[0, 1] bound to satisfy their privacy requirements.

Thus, in addition to the other privacy enhancing features of the illustrative embodiments, the illustrative embodiments further provide a neural network assessment framework and automated partitioning tool to assist end users is determining the optimal partitioning point at which to partition a pre-trained model into a FrontNet subnet mode and a BackNet subnet model. The neural network assessment framework quantifies the privacy loss to help end users determine the optimal partitioning layers for different neural network architectures.

Figure 4:
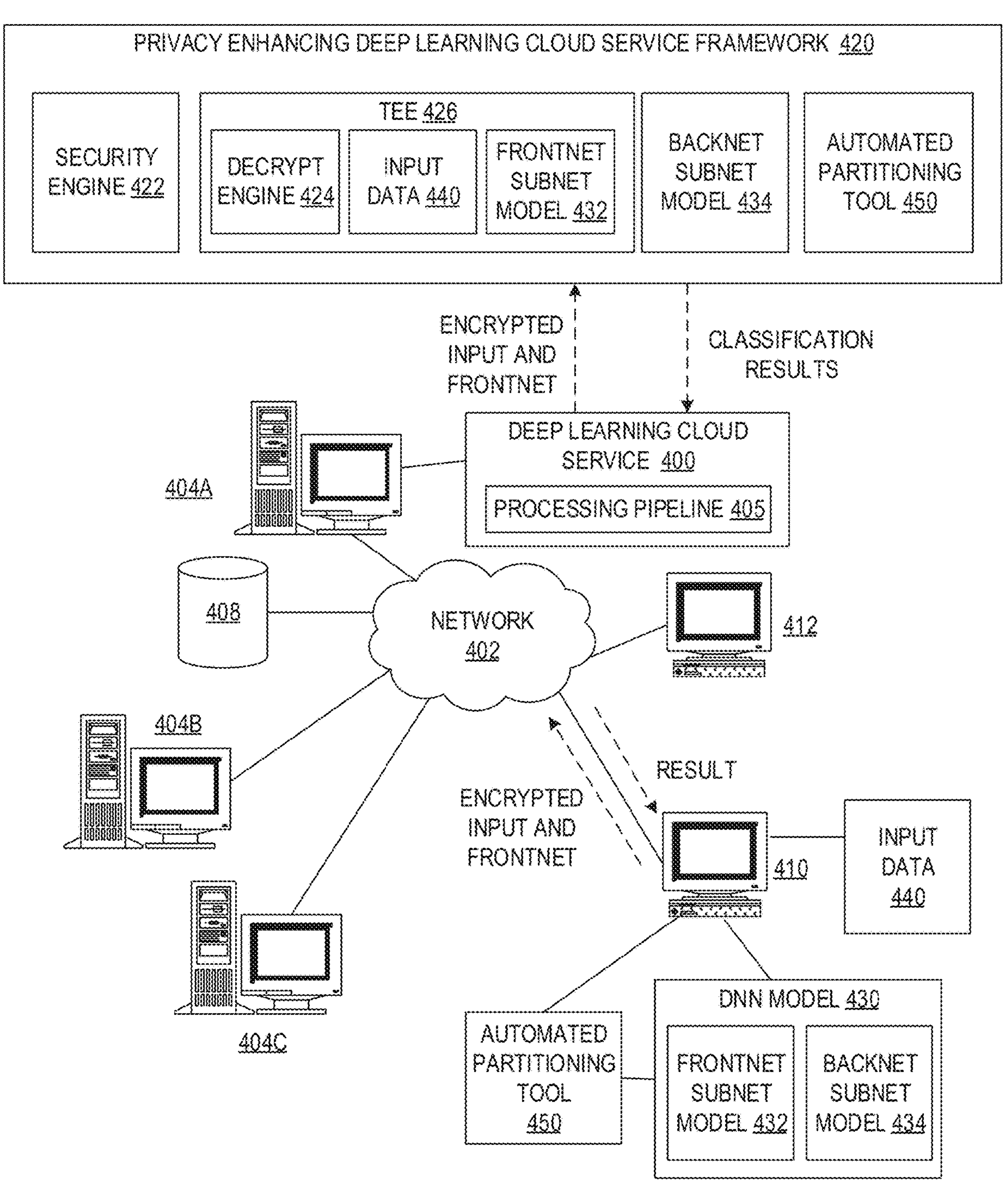
FIG. 4 depicts a pictorial representation of an example distributed data processing system in which aspects of the illustrative embodiments may be implemented.
Figure 5:
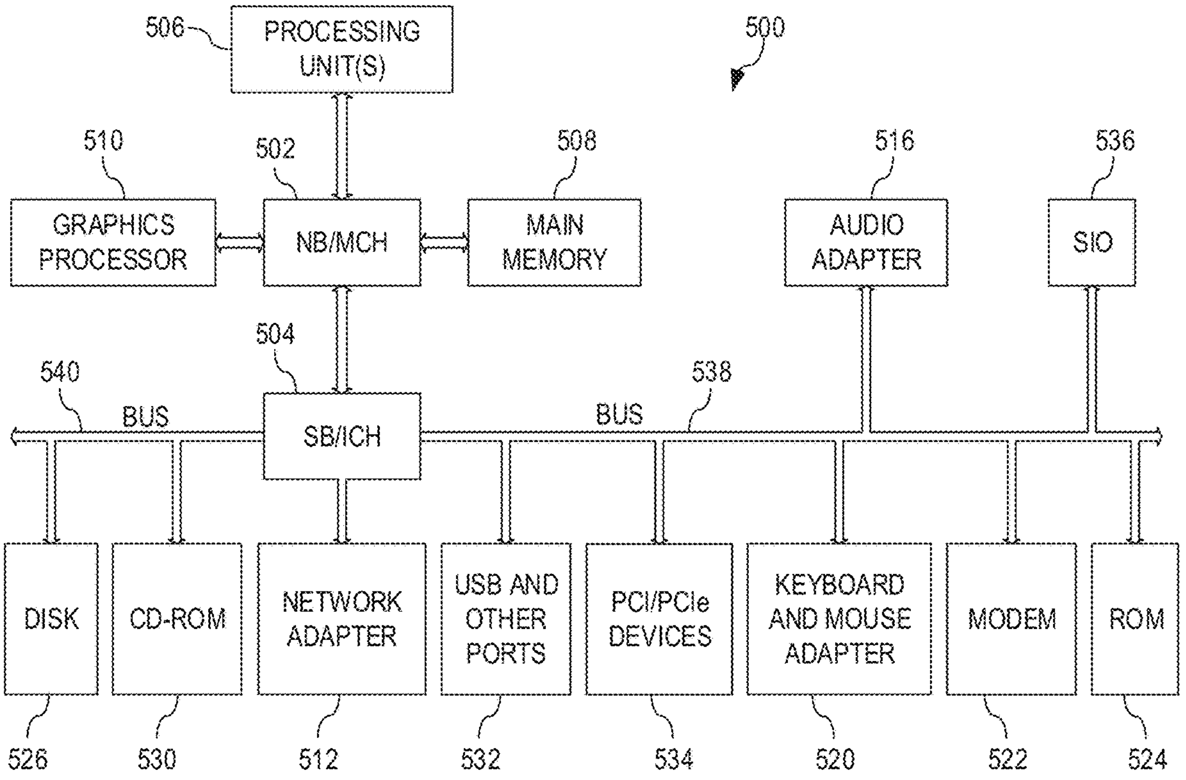
FIG. 5 is a block diagram of one example data processing system in which aspects of the illustrative embodiments may be implemented.

As is apparent from the above description, the present invention provides a computer tool for improving the privacy of input data to a deep learning system. Thus, the illustrative embodiments may be utilized in many different types of data processing environments. In order to provide a context for the description of the specific elements and functionality of the illustrative embodiments, FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, satellite communication links, fiber optic cables, or the like.

In the depicted example, servers 404A-404C are connected to network 402 along with storage unit 408. In addition, clients 410 and 412 are also connected to network 402. These clients 410 and 412 may be, for example, personal computers, network computers, or the like. In the depicted example, servers 404A-404C provide data, such as boot files, operating system images, and applications to the clients 410-412. Clients 410-412 are clients to a cloud computing system comprising server 404A, and possibly one or more of the other server computing devices 404B-404C, in the depicted example. Distributed data processing system 400 may include additional servers, clients, and other computing, data storage, and communication devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404A, may be specifically configured to implement a deep learning cloud service 400 which further implements a privacy enhancing deep learning cloud service framework 420, in accordance with one illustrative embodiment. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 404A, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates enhanced data and model privacy when using a deep learning cloud service by providing a trusted execution environment implementation and execution of a FrontNet subnet model of a DNN model within the trusted execution environment on decrypted input.

As shown in FIG. 4, one or more of the servers 404A-404C are configured to implement the deep learning cloud service 400 and privacy enhancing deep learning cloud service framework 420 (hereafter referred to as the "framework" 420). While FIG. 4 shows elements 400 and 420 being associated with a single server, i.e. server 404A, it should be appreciated that a plurality of servers, e.g., 404A-404C, may together constitute a cloud computing system and be configured to provide the deep learning cloud service 400 implementing the framework 420 such that the mechanisms of the deep learning cloud service 400, including the framework 420 or portions thereof, and the processing pipeline(s) 405 or portions thereof, may be distributed across multiple server computing devices 404A-404C. In some illustrative embodiments, multiple instances of the deep learning cloud service 400, pipeline(s) 405, and framework 420 may be provided on multiple different servers 404A-404C of the cloud computing system. The deep learning cloud service 400 may provide any deep learning or AI based functionality of a deep learning system, an overview of which, and examples of which, are provided hereafter.

In some illustrative embodiments, the deep learning cloud service 400 may implement a cognitive computing system, or cognitive system. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, image analysis and classification logic, electronic medical record analysis logic, etc., for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, image analysis and classification operations, intelligent search algorithms such as Internet web page searches, for example, medical diagnostic and treatment recommendations and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions: navigate the complexities of human language and understanding; Ingest and process vast amounts of structured and unstructured data; generate and evaluate hypothesis; weigh and evaluate responses that are based only on relevant evidence; provide situation-specific advice, insights, and guidance; improve knowledge and learn with each iteration and interaction through machine learning processes; enable decision making at the point of impact (contextual guidance); scale in proportion to the task; Extend and magnify human expertise and cognition; identify resonating, human-like attributes and traits from natural language; deduce various language specific or agnostic attributes from natural language; high degree of relevant recollection from data points (images, text, voice) (memorization and recall); predict and sense with situational awareness that mimic human cognition based on experiences; and answer questions based on natural language and specific evidence.

In one illustrative embodiment, a cognitive system, which may be implemented as a cognitive cloud service 400, provides mechanisms for answering questions or processing requests from client computing devices, such as client computing device 410, via one or more processing pipelines 405. It should be appreciated that while a single pipeline 405 is shown in FIG. 4, the present invention is not limited to such, and a plurality of processing pipelines may be provided. In such embodiments, the processing pipelines may be separately configured to apply different processing to inputs, operate on different domains of content from one or more different corpora of information from various sources, such as network data storage 408, be configured with different analysis or reasoning algorithms, also referred to as annotators, and the like. The pipeline 405 may process questions/requests that are posed in either natural language or as structured queries/requests in accordance with the desired implementation.

The pipeline 405 is an artificial intelligence application executing on data processing hardware that answers questions pertaining to a given subject-matter domain presented in natural language or processes requests to perform a cognitive operation on input data which may be presented in natural language or as a structured request/query. The pipeline 405 receives inputs from various sources including input over a network, a corpus of electronic documents or other data, data from a content creator, information from one or more content users, and other such inputs from other possible sources of input. Data storage devices, such as data storage 408, for example, store the corpus or corpora of data. A content creator creates content in a document for use as part of a corpus or corpora of data with the pipeline 405. The document may include any file, text, article, or source of data for use in the cognitive system, i.e. the cognitive cloud service 400. For example, a pipeline 405 accesses a body of knowledge about the domain, or subject matter area, e.g., financial domain, medical domain, legal domain, image analysis domain, etc., where the body of knowledge (knowledgebase) can be organized in a variety of configurations, e.g., a structured repository of domain-specific information, such as ontologies, or unstructured data related to the domain, or a collection of natural language documents about the domain.

In operation, the pipeline 405 receives an input question/request, parses the question/request to extract the major features of the question/request, uses the extracted features to formulate queries, and then applies those queries to the corpus of data. Based on the application of the queries to the corpus of data, the pipeline 405 generates a set of hypotheses, or candidate answers/results to the input question/request, by looking across the corpus of data for portions of the corpus of data that have some potential for containing a valuable response to the input question/request. The pipeline 405 performs deep analysis on the input question/request and the portions of the corpus of data found during the application of the queries using a variety of reasoning algorithms. There may be hundreds or even thousands of reasoning algorithms applied, each of which performs different analysis, e.g., comparisons, natural language analysis, lexical analysis, image analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity. Still further, some reasoning algorithms may perform image analysis so as to classify images into one of a plurality of classes indicating the nature of the image.

The scores obtained from the various reasoning algorithms indicate the extent to which the potential response is inferred by the input question/request based on the specific area of focus of that reasoning algorithm. Each resulting score is then weighted against a statistical model. The statistical model captures how well the reasoning algorithm performed at establishing the inference between two similar inputs for a particular domain during the training period of the pipeline 405. The statistical model is used to summarize a level of confidence that the pipeline 405 has regarding the evidence that the potential response, i.e. candidate answer/result, is inferred by the question/request. This process is repeated for each of the candidate answers/results until the pipeline 405 identifies candidate answers/results that surface as being significantly stronger than others and thus, generates a final answer/result, or ranked set of answers/results, for the input question/request.

As shown in FIG. 4, the deep learning cloud service 400 and its corresponding processing pipeline(s) 405 implement a privacy enhancing deep learning cloud service framework 420, or simply framework 420 hereafter. The framework 420 may be invoked by one or more of the reasoning algorithms of the processing pipeline 405 when performing its operations for reasoning over the input question/request and/or processing input data associated with the input question/request. For example, in some illustrative embodiments, the framework 520 may be invoked to assist with classifying input data into one of a plurality of predetermined classes using a deep learning neural network (DNN) model, for example. The result generated by the framework 420, e.g., a vector output with probability values associated with each of the predetermined classes to thereby identify a classification of the input data, or simply the final classification itself, may be provided back to the processing pipeline 405 for use in performing other deep learning operations, examples of which have been noted above.

The framework 420 comprises a security engine 422, a trusted execution environment (TEE) 426 implementing a decryption engine 424, and an automated partitioning tool 450 that implements a neural network assessment framework as described previously. In addition, within the TEE 426, encrypted input data and an encrypted FrontNet subnet model are decrypted by the decryption engine 424 to provide input data 440 and FrontNet subnet model 432. A BackNet subnet model 434 may be provided to the framework 420 by a client computing device 410 for instantiation in the framework 420. The security engine 422 provides the logic for performing authentication, attestation, and exchange of security keys with client computing devices 410, such as by way of establishing a Transport Layer Security (TLS) connection or other secure communication connection between the server 404A and the client computing device 410.

In operation, an end user of a client computing device 410 wishes to utilize the deep learning cloud service 400 to perform a deep learning operation on input data, e.g., image analysis and classification, by providing a pre-trained DNN model 430 and input data 440 to the deep learning cloud service 400. In accordance with the illustrative embodiments, in order to enhance the privacy of the end user's input data, the DNN model 430 is partitioned into a FrontNet subnet model 432 and a BackNet subnet model 434. The partitioning of the DNN model 430 may be performed manually by the end user, or may be performed in an automated manner, such as by using an automated partitioning tool 450 provided by the deep learning cloud service 400. That is, in one illustrative embodiment, the client computing device 410 may log onto the server 404A and access the deep learning cloud service 400, performing appropriate authentication and attestation operations, exchange of security keys, and the like. The end user of the client computing device 410 may then request download of the automated partitioning tool 450 for execution on the local client computing device 410 so as to determine the optimal partition point of the pre-trained DNN model 430.

The DNN model 430 may then be partitioned into FrontNet subnet model 432 and BackNet subnet model 434 based on the determined optimal partition point, e.g., the particular hidden or middle layer of the DNN model 430 where the model should be partitioned.

Based on the exchanged security keys via the security engine 422, e.g., symmetric keys, the client computing device 410 encrypts the FrontNet subnet model 432 and provides the DNN model 430, comprising both the encrypted FrontNet subnet model 432 and the unencrypted BackNet subnet model 434, to the server 404A and deep learning cloud service 400. The framework 420 of the deep learning cloud service 400 loads the encrypted FrontNet subnet model 432 into the TEE 426 where it is decrypted and used as a basis for instantiating a DNN implementation of the FrontNet subnet model 432 executing within the TEE 426. The BackNet subnet model 434 is instantiated in the framework 420 outside the TEE 426 as a DNN implementation of the BackNet subnet model 434.

The client computing device 410 may then transmit encrypted input data, i.e. input data 440 encrypted using the exchanged security keys, to the deep learning cloud service 400 for processing. As part of the processing, such as processing via the processing pipeline 405, the deep learning cloud service 400 may invoke the framework 420 to process the encrypted input data that is received. The encrypted input data is loaded into the TEE 426 where it is decrypted by the decryption engine 424 to generate the original input data 440. The input data 440 is input to the FrontNet subnet model 432 DNN executing in the TEE 426 which generates intermediate representations (IR) that are output to the BackNet subnet model 434. The BackNet subnet model 434 DNN then processes the IR output from the FrontNet subnet model 432 DNN to generate a classification output that is provided back to the deep learning cloud service 400 and/or processing pipeline 405 for use in performing a deep learning operation based on the input data. Results of the deep learning operation may then be returned to the client computing device 410. It should be appreciated that in this process, both the input data 440 and the FrontNet subnet model 432 privacy are preserved as they are only decrypted within the TEE 426 and are not exposed outside of the TEE 426.

As noted above, the mechanisms of the illustrative embodiments utilize specifically configured computing devices, or data processing systems, to perform the operations for executing a portion of a DNN model within a trusted execution environment on encrypted input data which is decrypted within the trusted execution environment. These computing devices, or data processing systems, may comprise various hardware elements which are specifically configured, either through hardware configuration, software configuration, or a combination of hardware and software configuration, to implement one or more of the systems and/or subsystems described herein. FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System p® computer system, Power™ processor based computer system, or the like, running the Advanced Interactive Executive (AIX)® operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the deep learning cloud service implementing the privacy enhancing deep learning cloud service framework and one or more processing pipelines.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

Figure 6:
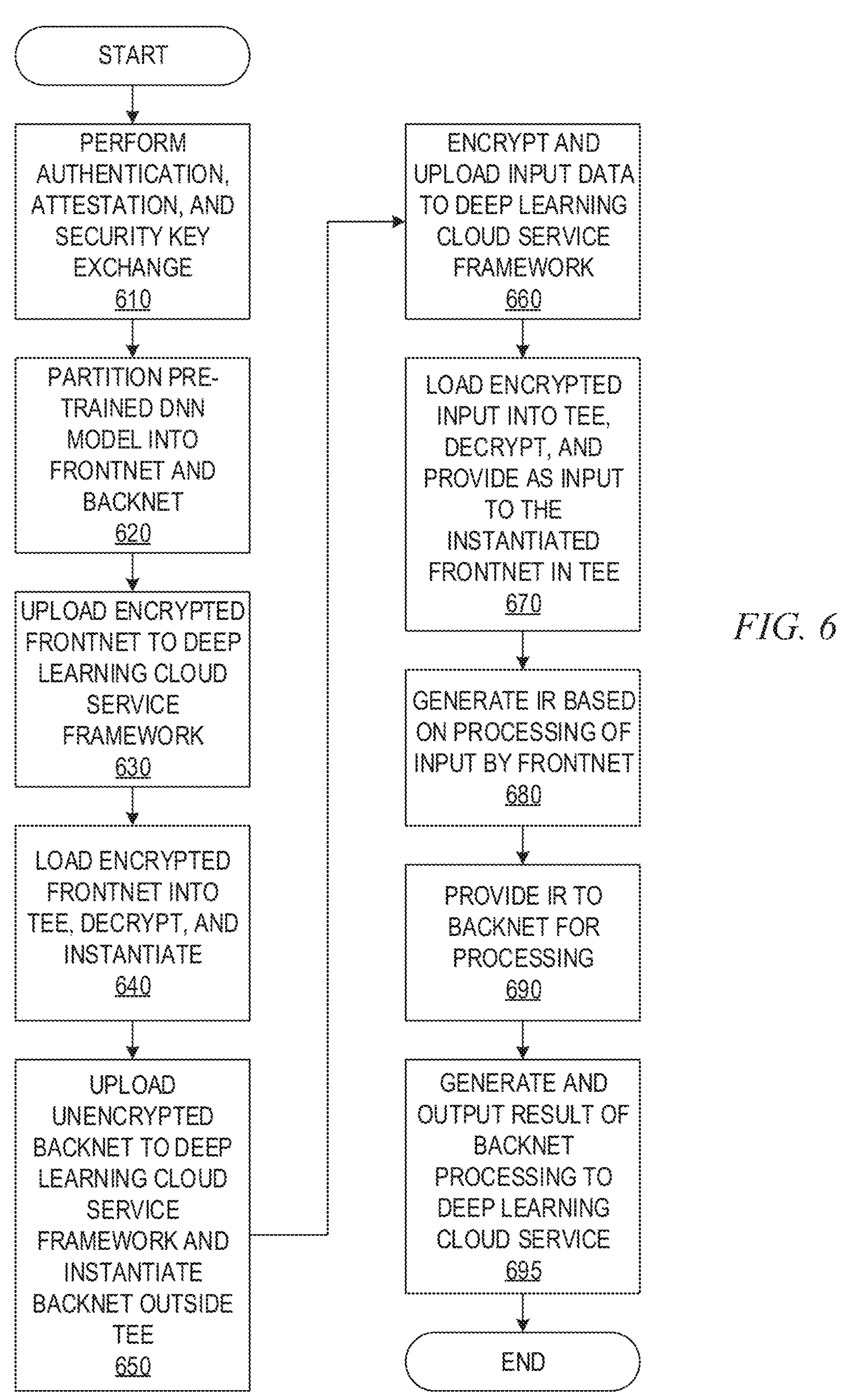
FIG. 6 is a flowchart outlining an example operation for configuring and utilizing a privacy enhancing deep learning cloud computing service in accordance with one illustrative embodiment.

FIG. 6 is a flowchart outlining an example operation for configuring and utilizing a privacy enhancing deep learning cloud computing service in accordance with one illustrative embodiment. As shown in FIG. 6, the operation starts by performing an authentication of the end user, attestation, and security key exchange, such as via a TLS or other secure communication connection between the deep learning cloud service computing system and the end user's client computing device (step 610). The end user partitions their pre-trained DNN model into a FrontNet subnet model and a BackNet subnet model (step 620). As noted above, this may be performed manually or with the assistance of an automated partitioning tool which may be provided by the deep learning cloud service to the client computing device for local execution, for example.

The FrontNet subnet model is encrypted using the security keys exchanged and uploaded to the deep learning cloud service framework (step 630). The deep learning cloud service framework loads the encrypted FrontNet subnet model into a trusted execution environment (TEE), decrypts the FrontNet subnet model, and instantiates it as a DNN executing within the TEE (step 640). The unencrypted BackNet subnet model is uploaded to the deep learning cloud service framework which instantiates it as a DNN executing outside the TEE (step 650).

The input data that is to be processed by the pre-trained DNN now executing on the deep learning cloud service framework is encrypted and uploaded to the deep learning cloud service framework (step 660) where it is loaded into the TEE, decrypted, and provided as input to the FrontNet subnet model DNN (step 670). The FrontNet subnet model DNN processes the decrypted input and generates an intermediate representation (IR) (step 680) which is output to the BackNet subnet model DNN executing outside the TEE (step 690). The BackNet subnet model DNN generates and outputs the final result of the processing of the input data and provides the results back to the deep learning cloud service for performance of additional deep learning operations (step 695). The operation then terminates.

Thus, the illustrative embodiments provide a privacy enhancing deep learning or AI cloud service framework that maintains the secrecy of an end user's input data by providing a trusted execution environment in which a portion of a pre-trained DNN executes on input data, both of which are encrypted and not accessible in an unencrypted manner outside the TEE. It is to be understood that although this disclosure includes a detailed description of embodiments of the present invention being implemented on cloud computing systems, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of a cloud model are as follows:

(1) On-demand self-service: a cloud consumer can unilaterally provision computing capabilities, such as server time and network storage, as needed automatically without requiring human interaction with the service's provider.

(2) Broad network access: capabilities are available over a network and accessed through standard mechanisms that promote use by heterogeneous thin or thick client platforms (e.g., mobile phones, laptops, and PDAs).

(3) Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

(4) Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

(5) Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

(1) Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(2) Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

(3) Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

(1) Private cloud: the cloud infrastructure is operated solely for an organization. It may be managed by the organization or a third party and may exist on-premises or off-premises.

(2) Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

(3) Public cloud: the cloud infrastructure is made available to the general public or a large industry group and is owned by an organization selling cloud services.

(4) Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
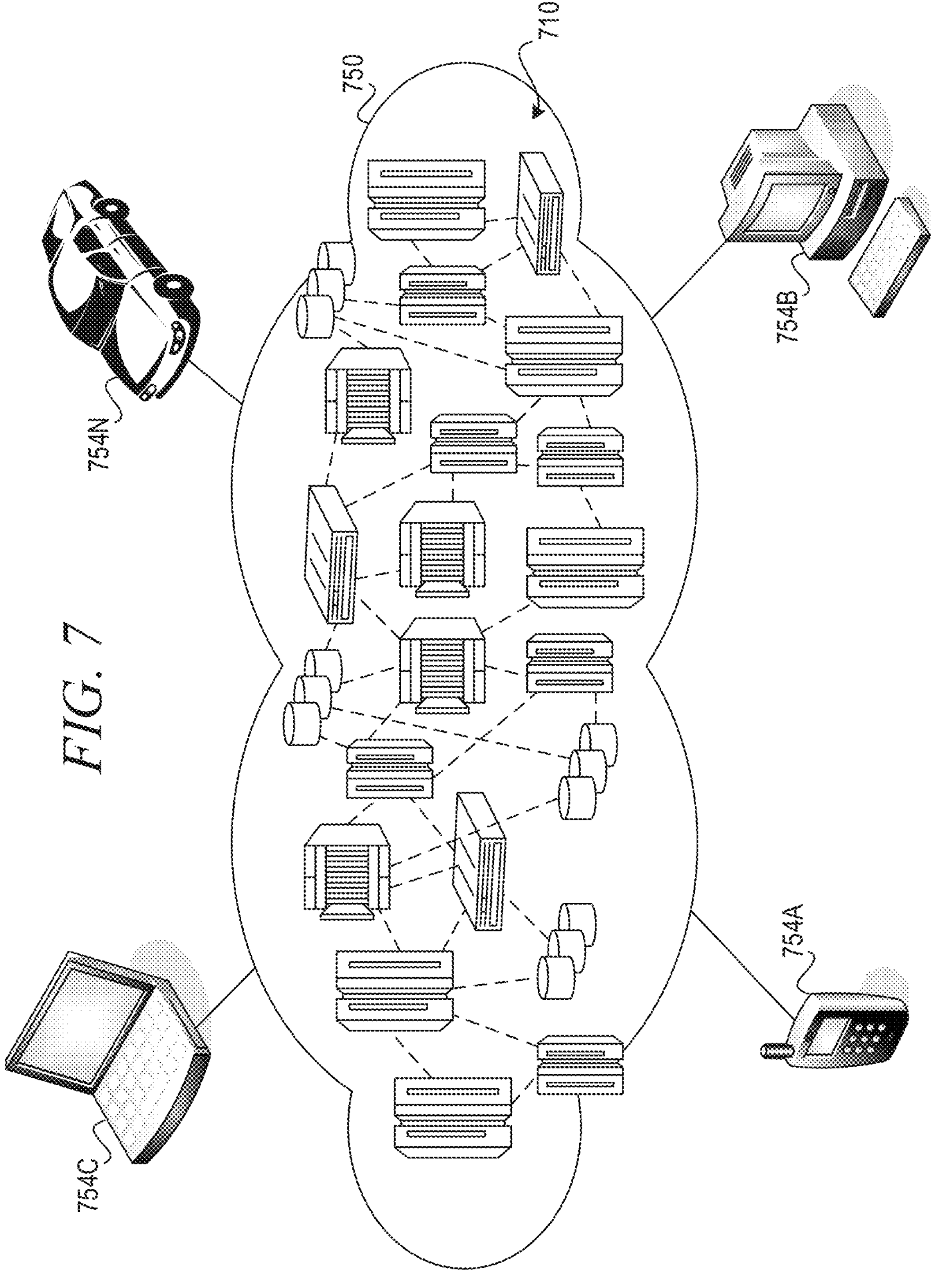
FIG. 7 depicts a cloud computing environment according to an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
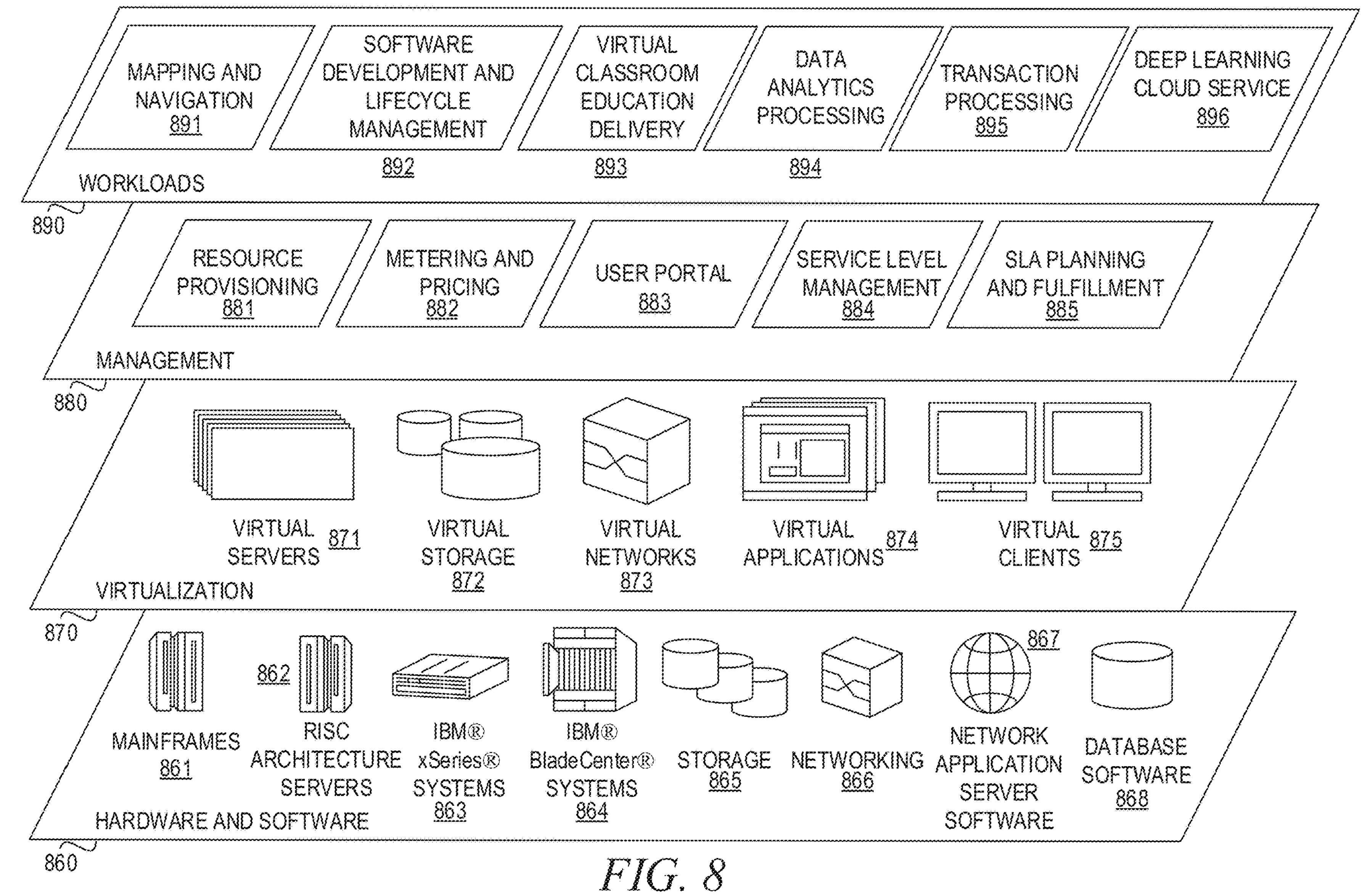
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

(1) Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

(2) Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and deep learning cloud computing service processing 896. The deep learning cloud computing service processing 896 may comprise the pipelines and enhanced privacy cloud computing service framework previously described above with regard to one or more of the described illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to configure the at least one processor to implement an enhanced privacy deep learning system framework, the method comprising:

receiving, by the enhanced privacy deep learning system framework, from a client computing device, a first subnet model of a neural network, wherein the first subnet model is one partition of multiple partitions of the neural network, and wherein the first subnet model is encrypted;

loading, by the enhanced privacy deep learning system framework, the first subnet model into a trusted execution environment of the enhanced privacy deep learning system framework;

decrypting, by the enhanced privacy deep learning system framework, the first subnet model within the trusted execution environment and executing the first subnet model within the trusted execution environment;

receiving, by the enhanced privacy deep learning system framework, encrypted input data from the client computing device;

loading, by the enhanced privacy deep learning system framework, the encrypted input data into the trusted execution environment; and decrypting and processing, by the enhanced privacy deep learning system framework, the input data in the trusted execution environment using the first subnet model executing within the trusted execution environment.

2. The method of claim 1, wherein the neural network is partitioned into at least the first subnet model and a second subnet model, and wherein the first subnet model is a FrontNet subnet model comprising an input layer of the neural network and one or more intermediate layers of the neural network model, and wherein the second subnet model is a BackNet subnet model comprising an output layer of the neural network and one or more intermediate layers of the neural network model.

3. The method of claim 2, wherein a partition point in the neural network indicating a last intermediate layer to be included in the FrontNet subnet model is selected as an intermediate layer whose intermediate representation output does not contain sensitive information corresponding to an input to the neural network, and wherein subsequent intermediate layers and the output layer of the neural network are included in the BackNet subnet model.

4. The method of claim 2, wherein the neural network is partitioned automatically using an automated partitioning tool that identifies an optimal partition point in the neural network at which to partition the neural network, wherein the optimal partition point identifies an intermediate layer at which to partition the neural network.

5. The method of claim 1, wherein the processing of the input data in the trusted execution environment using the first subnet model executing within the trusted execution environment generates one or more intermediate representations of processing of the input data, and wherein the method further comprises:

inputting the one or more intermediate representations into a second subnet model of the neural network;

processing the one or more intermediate representations to generate result data; and outputting the result data.

6. The method of claim 5, wherein the second subnet model executes outside the trusted execution environment.

7. The method of claim 5, wherein the result data is a N-dimensional real-value vector that represents a probability distribution over N different possible classes, and wherein the method further comprises selecting a top-k classes with corresponding probability values from the N-dimensional real-value vector, to return to the client computing device.

8. The method of claim 5, wherein the result data is output to a deep learning system to perform a deep learning operation based on the result data.

9. The method of claim 8, wherein the deep learning operation is a deep learning image recognition operation, the input data is an input image, and the result data is a classification of the input image into one of a plurality of predefined classes.

10. The method of claim 1, wherein the trusted execution environment prevents access to the decrypted first subnet model and decrypted input data from outside the trusted execution environment.

11. A computer program product comprising a computer readable storage medium having a computer readable program stored therein, wherein the computer readable program, when executed on a data processing system, causes the data processing system to implement an enhanced privacy deep learning system framework that is configured to:

receive from a client computing device, a first subnet model of a neural network, wherein the first subnet model is one partition of multiple partitions of the neural network, and wherein the first subnet model is encrypted;

load the first subnet model into a trusted execution environment of the enhanced privacy deep learning system framework;

decrypt the first subnet model within the trusted execution environment and execute the first subnet model within the trusted execution environment;

receive encrypted input data from the client computing device;

load the encrypted input data into the trusted execution environment; and decrypt and process the input data in the trusted execution environment using the first subnet model executing within the trusted execution environment.

12. The computer program product of claim 11, wherein the neural network is partitioned into at least the first subnet model and a second subnet model, and wherein the first subnet model is a FrontNet subnet model comprising an input layer of the neural network and one or more intermediate layers of the neural network model, and wherein the second subnet model is a BackNet subnet model comprising an output layer of the neural network and one or more intermediate layers of the neural network model.

13. The computer program product of claim 12, wherein a partition point in the neural network indicating a last intermediate layer to be included in the FrontNet subnet model is selected as an intermediate layer whose intermediate representation output does not contain sensitive information corresponding to an input to the neural network, and wherein subsequent intermediate layers and the output layer of the neural network are included in the BackNet subnet model.

14. The computer program product of claim 12, wherein the neural network is partitioned automatically using an automated partitioning tool that identifies an optimal partition point in the neural network at which to partition the neural network, wherein the optimal partition point identifies an intermediate layer at which to partition the neural network.

15. The computer program product of claim 11, wherein the processing of the input data in the trusted execution environment using the first subnet model executing within the trusted execution environment generates one or more intermediate representations of processing of the input data, and wherein the method further comprises:

inputting the one or more intermediate representations into a second subnet model of the neural network;

processing the one or more intermediate representations to generate result data; and outputting the result data.

16. The computer program product of claim 15, wherein the second subnet model executes outside the trusted execution environment.

17. The computer program product of claim 15, wherein the result data is a N-dimensional real-value vector that represents a probability distribution over N different possible classes, and wherein the method further comprises selecting a top-k classes with corresponding probability values from the N-dimensional real-value vector, to return to the client computing device.

18. The computer program product of claim 15, wherein the result data is output to a cognitive system to perform a cognitive operation based on the result data.

19. The computer program product of claim 18, wherein the cognitive operation is a cognitive image recognition operation, the input data is an input image, and the result data is a classification of the input image into one of a plurality of predefined classes.

20. A system, comprising:

at least one processor; and at least one memory coupled to the at least one processor, wherein the at least one memory comprises instructions which, when executed by the at least one processor, cause the at least one processor to implement an enhanced privacy deep learning system framework that is configured to:

receive from a client computing device, a first subnet model of a neural network, wherein the first subnet model is one partition of multiple partitions of the neural network, and wherein the first subnet model is encrypted;

load the first subnet model into a trusted execution environment of the enhanced privacy deep learning system framework;

decrypt the first subnet model within the trusted execution environment and execute the first subnet model within the trusted execution environment;

receive encrypted input data from the client computing device;

load the encrypted input data into the trusted execution environment; and decrypt and process the input data in the trusted execution environment using the first subnet model executing within the trusted execution environment.

* * * * *